UNITED STATES PATENT OFFICE.

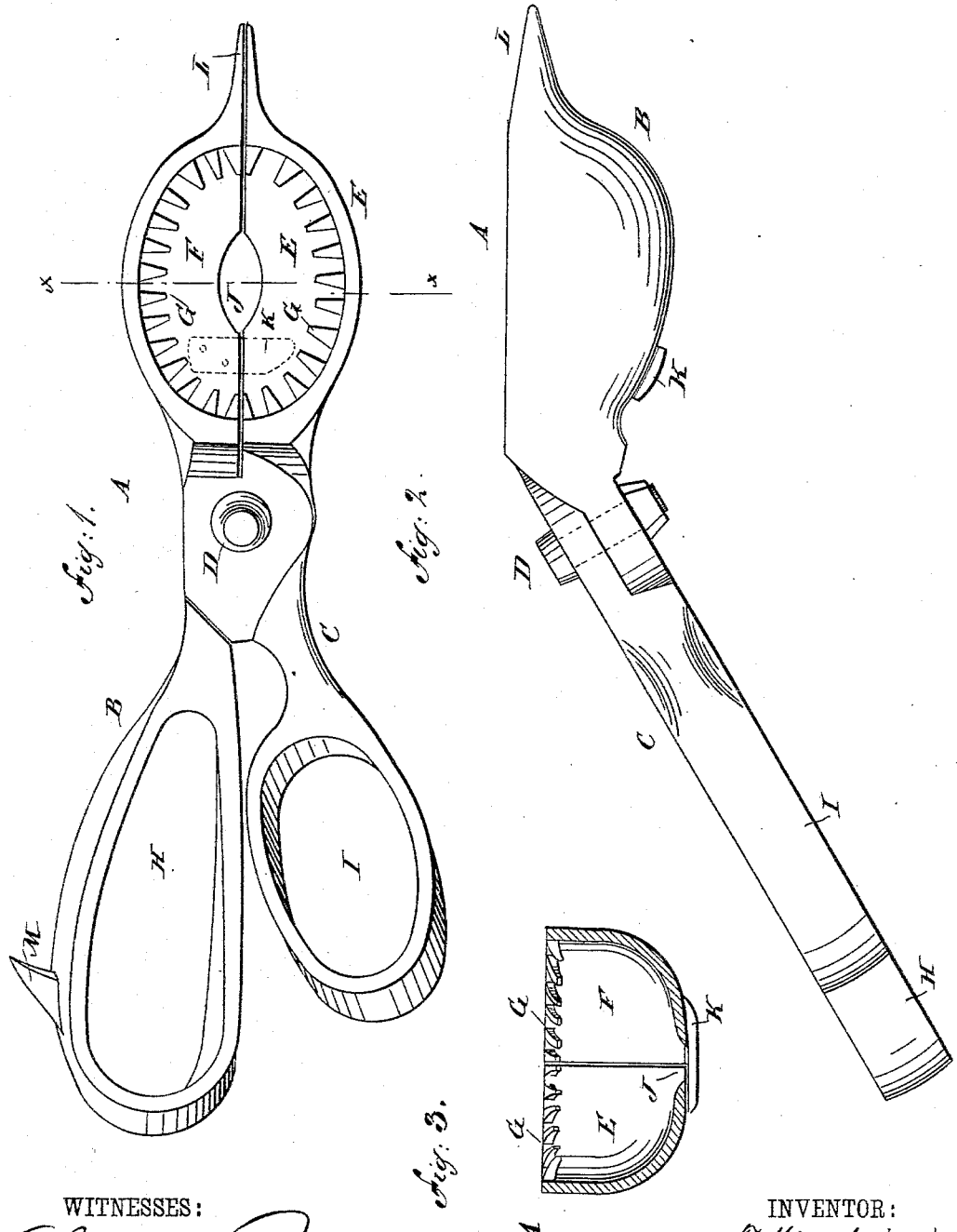

THEODOR H. MEHRING, OF NIOBRARA, NEBRASKA.

CORN-HUSKER.

SPECIFICATION forming part of Letters Patent No. 387,985, dated August 14, 1888.

Application filed August 6, 1887. Serial No. 246,281. (No model.)

*To all whom it may concern:*

Be it known that I, THEODOR H. MEHRING, of Niobrara, in the county of Knox and State of Nebraska, have invented a new and Improved Corn-Husker, of which the following is a full, clear, and exact description.

The object of my invention is to provide a new and improved corn-husker, by means of which the husk of the corn can be easily and quickly torn from the ear.

The construction and combination of parts forming the complete device will be hereinafter described, and the novel features indicated in the claims.

Reference is to be had to the accompanying drawings, forming a part of this specification, in which similar letters of reference indicate corresponding parts in all the figures.

Figure 1 is a plan view showing my improvement. Fig. 2 is a side elevation of the same, and Fig. 3 is a cross section of the same on the line $x\,x$, Fig. 1.

The husker A is made of two parts, B and C, having loop-handles H and I, (like tailors' large shears,) and pivoted together at D, so that the jaws E F may be opened and closed like shear-blades. Each of said jaws is concave, and approximates in form a quarter-section of a hollow sphere; but each is preferably slightly elongated, as shown. Their concave sides are opposite each other, so that when closed, as shown in Fig. 1, they form a cup-like cavity; but their meeting edges are cut away at the middle, thus forming an aperture, J, when the jaws are closed. Each jaw has a row of short inwardly-projecting teeth, G, around the edge, which is shown uppermost in Fig. 1, and each has a pointed prong, L, at its outer end, whose function, jointly with the opposite prong, is to guide the ears of corn into the space between the jaws when open. As shown in Fig. 2, the jaws E and F are not in the same plane with the handles H and I, but at a considerable angle thereto, to adapt the implement to be manipulated more conveniently. A handle, H, is provided with a sharp-edged tooth, M, which is used to cut silky threads found on ears of corn.

The operation is as follows: The operator takes hold of the corn-husker A with his right hand, so that his thumb is in the looped handle I, and his four fingers grasp the handle H in such a manner as to enable him to open and close the jaws B and C at will. With his left hand he takes hold of an ear of corn at the outer end of the same, and then opens the jaws B and C and passes the pointed ends L over the stem of the ear of corn until the inner end of the husk is inclosed by the said jaws E and F, so that the stem of the ear of corn projects through the aperture J. The operator then closes the jaws, so that the teeth G penetrate the husk; and as the stem of the ear of corn is firmly held in the aperture J a slight twist of the device with the right hand will free the ear of corn from the husk by breaking the stem from the ear. The husked ear remains in the operator's left hand while the husk is held by the jaws B and C, but is freed from the same upon opening them. The loops in the handles H and I are large enough to permit the operator to wear gloves.

What I claim is—

1. A corn-husker consisting of parts B and C, pivoted together and provided with handles, and having the curved jaws E and F, which are constructed with inwardly-projecting teeth and cut away on the lower side, as shown, whereby when the said jaws are closed they form together a cup-like device having an aperture, J, as shown and described.

2. In a corn-husker, the part B, having the curved or hollow jaw E, provided with the teeth G and cut away at J, and the pointed prong L, in combination with the part C, having a similar jaw, F, provided with teeth G and cut away at J, the guide K, the pointed prong L, and the pivot D, substantially as shown and described.

3. In a corn-husker, the part B, provided with the looped handle H, the curved or hollow jaw E, cut away at J and having the teeth G, the pointed prong L, and the sharp-edged lug M, in combination with the part C, provided with the looped handle I, the jaw F, having teeth G and cut away at J, the pointed prong L, the guide K, and the pivot D, substantially as shown and described.

THEODOR H. MEHRING.

Witnesses:
JOHN BEEKER,
PATRICK CONWAY.